(12) United States Patent
Wermeister

(10) Patent No.: US 6,632,051 B1
(45) Date of Patent: Oct. 14, 2003

(54) CUTTING BIT, CUTTING TOOL AND METHOD FOR MACHINING, ESPECIALLY ROTATIONALLY SYMMETRICAL WORK PIECE SURFACES

(75) Inventor: Günter Wermeister, Düsseldorf (DE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/719,633

(22) PCT Filed: May 31, 1999

(86) PCT No.: PCT/DE99/01667

§ 371 (c)(1),
(2), (4) Date: Feb. 12, 2001

(87) PCT Pub. No.: WO99/67046

PCT Pub. Date: Dec. 29, 1999

(30) Foreign Application Priority Data

Jun. 19, 1998 (DE) .................... 298 10 969 U

(51) Int. Cl.[7] .............................. B23B 27/22
(52) U.S. Cl. .................... 407/114; 407/116; 81/1.11
(58) Field of Search ................ 407/113, 114, 407/116, 103, 105; 82/1.11

(56) References Cited

U.S. PATENT DOCUMENTS

| 3,574,911 | A | * | 4/1971 | Penoyar | 407/114 |
| 4,180,355 | A | * | 12/1979 | Nanini | 407/113 |
| 4,248,553 | A | * | 2/1981 | Kraemer | 407/114 |
| RE30,908 | E | * | 4/1982 | Friedline et al. | 407/114 |
| 4,681,486 | A | * | 7/1987 | Hale | 407/114 |
| 4,867,616 | A | | 9/1989 | Jakubowicz | |
| 5,075,181 | A | * | 12/1991 | Quinto et al. | 407/113 |
| 5,221,164 | A | * | 6/1993 | Allaire | 407/113 |
| 5,373,631 | A | | 12/1994 | Schmid | |
| 5,733,078 | A | * | 3/1998 | Matsushita et al. | 408/222 |
| 5,976,455 | A | * | 11/1999 | Pantzar et al. | 407/103 |

FOREIGN PATENT DOCUMENTS

| FR | 2 317 986 | 2/1977 |
| GB | 2 030 899 | 4/1980 |

* cited by examiner

Primary Examiner—Steven C. Bishop
(74) Attorney, Agent, or Firm—Burns, Doane, Swecker & Mathis, LLP

(57) ABSTRACT

A cutting bit has the basic form of a prism, including two substantially parallel top and bottom surfaces and at least three lateral surfaces running substantially perpendicular to the top and bottom surfaces. A cutting edge is embodied in the transition area from at least one of the lateral surfaces to the top or bottom surface and wherein the at least one lateral surface has alternate projecting and recoiling sections viewed from above or from below. Effective main cutting edges are embodied at least in the area of the projecting sections, and wherein optionally secondary cutting edges extend from the relatively projecting main cutting edges backwards along the recoiling sections for at least at a given cutting depth.

11 Claims, 4 Drawing Sheets

CUTTING BIT, CUTTING TOOL AND METHOD FOR MACHINING, ESPECIALLY ROTATIONALLY SYMMETRICAL WORK PIECE SURFACES

BACKGROUND OF THE INVENTION

The present invention relates to a cutting bit, a cutting tool and a method for machining.

Similar cutting bits, cutting tools and a machining method for use therewith are described in German Patent Application No. 41 35 681 and the corresponding European Patent Application No. 542 026.

That publication describes an apparatus and a method for machining rotationally symmetrical work piece surfaces, wherein various cutting bits are arranged along a disc-shaped tool carrier and are engaged successively with the work piece for machining. Therein, final machining is in the form of a roughing-down and smoothing operation during which a cutting bit with a substantially zigzag main cutting edge, i.e. formed by projecting and recoiling sections of the cutting bit, is advanced firstly in a radial direction, and then in a roughing-down operation a certain layer thickness is taken off the work piece surface for machining, whereupon the tool is then moved axially in order to perform a smoothing operation by means of which fine machining is effected.

U.S. Pat. No. 4,867,616 discloses a cutting bit which has the basic form of a prism, comprising two substantially parallel top and bottom surfaces and four lateral surfaces substantially perpendicular to the top and bottom surfaces, wherein cutting edges are formed at the transition of the lateral surfaces to the top and bottom surfaces, and wherein those lateral surfaces are not even, and, in the plan view onto the top surface or bottom surface, has alternate projecting and recoiling sections, wherein effective sections of main cutting edges are formed in the region of the projecting sections, and wherein secondary cutting edges extend from the relatively projecting sections of the main cutting edges rearwardly along the recoiling sections at least by a predetermined insertion depth.

With that cutting bit, the secondary cutting edges are bent relative to the main cutting edges partially by 60° and in the corner regions by 45° Furthermore, the machining surfaces are formed by recesses which are associated individually with each section of main cutting edge, wherein in the central region of a main cutting edge an angle of between 62° and 72° results between the machining surface and the main free surface.

Corresponding cutting bits are mounted on a milling cutter in such a way that their main cutting edges slightly overlap, and the main cutting edges of a cutting bit alternatingly cover over the recoiling regions of a successive cutting bit, so that the secondary cutting edges only engage with the tool by way of their regions which are directly adjacent to the main cuts. A corresponding tool is provided exclusively for feed in a radial direction, for the purpose of milling grooves, or the like, in a tool, for example.

OBJECTS AND SUMMARY OF THE INVENTION

In the face of this prior art, the aim of the present invention is to create a cutting bit, a cutting tool, and a corresponding method for machining work pieces, wherein the cutting bit is intended to be fed not only radially but also axially during machining the work pieces, and wherein the corresponding work piece surfaces should be of good quality and efficiently produced, i.e. within strict tolerances.

The selection of special angles firstly permits a positive cutting geometry both during radial and axial feed to the work piece, and, additionally, the reaction forces occurring are kept relatively low, so that neatly defined work piece surfaces can be produced within strict tolerances.

The design of the cutting bit according to the invention enables the cutting bit to be inclined somewhat downwardly relative to the feed direction, wherein a free surface is prepared for improved radial feed of the cutting bit to the work tool or to the work piece surface for machining, on the one hand, whilst it is still possible to maintain a positive cutting edge geometry whereby the cutting forces occurring are reduced.

With respect to a corresponding tool, the problem forming the basis of the invention is solved in that in the tool a corresponding cutting bit is used, and in that the tool seat has a supporting surface for the top or bottom surface of the cutting bit, which is inclined such that it falls away at an angle of between 8° and 12° relative to the radial feed direction.

The corresponding method uses a cutting bit and a cutting tool of the afore-mentioned kind, wherein the radial feed of the cutting bit towards the work piece surface is such that the top and bottom surfaces are inclined such that they fall away to the front relative to that feed direction.

The terms, "radial feed direction" and "axial direction" refer herein, first and foremostly, to a work piece which is rotating about an axis, so that during machining a rotationally symmetrical surface is produced on that work piece. Therein, the feed generally takes place in such a way that the cutting edge and the axis of rotation of the rotating work piece lie in a common plane, and feed of the cutting bit also takes place exactly in that plane, initially in a radial direction. After the desired diameter of the rotationally symmetrical work piece has essentially been obtained, the cutting bit moves axially relative to the work piece for fine machining to ensue, and, in particular, the regions which initially were still remaining between the interrupted main cutting edges are removed by axial rotation.

However, the invention can be extended thoroughly to machining methods in which non-rotationally symmetrical surfaces, e.g. even surfaces, are machined, and the cutting bit is accordingly arranged on a rotating tool. In such a case, the terms, "radial feed" and "axial feed" are defined in relation to the axis of rotation of the tool.

According to the invention, the complementary angle cc between the machining surface and a plane which is perpendicular to the plane of the free surfaces of the main cutting edges is between 14 and 18°, and, with a preferred embodiment, it is 16°.

This means, for example, that in the case of the preferred embodiment mentioned latterly, the seating for the cutting bit, or the top and bottom surfaces of the cutting bit can be inclined at an angle of approximately 10° relative to the feed direction, wherein a positive machining angle of approximately 6° nonetheless remains in the region of the main cutting edge. The inclination of the top and bottom surfaces by approximately 10° relative to the feed direction means at the same time that the plane of the free surfaces, which, due to the prismatic basic form of the cutting bit, extends substantially perpendicularly to the top and bottom surfaces, is likewise inclined by 10° relative to a tangent on the work piece surface in the region of the active main cutting edge, so that an effective free angle of about 10° is formed. It will be appreciated that in the case of a rotating work piece surface because of the curvature of the surface generated the free angle becomes increasingly larger directly behind the cutting edge.

This cutting geometry and arrangement of the cutting bit produce very small cutting forces so that harmful vibration of the work piece, such as can occur with different cutting edge geometries, is largely avoided. At the same time, wear to the cutting edge is reduced.

In addition, the geometry of the cutting bit which is actually selected enables main cutting edges 10 to be formed both at the transition of the respective lateral surface to the top surface as well as at the transition of that lateral surface to the bottom surface of the cutting bit. Therefore, after one of the main cutting edges of the cutting bit has become worn, the cutting bit can be turned and used again. This effect is rendered two-fold in a preferred embodiment of the invention wherein the cutting bit has the basic form of a cuboid with two shorter lateral surfaces and two longer lateral surfaces, wherein cutting edges are formed on each of two oppositely disposed lateral surfaces, and, to be more exact, at the transition to the top and bottom surface respectively, so that a total of four main cutting edges is formed which are interrupted main cutting edges corresponding to the projecting and recessed regions of the lateral surfaces and to which respective secondary cutting edges are adjacently disposed which extend at least a little way into the recessed regions of the lateral surfaces in question.

In this embodiment, there is a total of four cutting edges, each of which can be changed over after the cutting edges have become worn. This makes the cutting bit according to the invention very economical to use.

One embodiment of the invention is particularly preferred wherein the individual sections of the interrupted main cutting edge are main cutting edge sections lying on a common straight line. This facilitates the production of rotationally symmetrical surfaces.

In the preferred embodiment, the secondary cutting edges which are adjacent to the main cutting edge sections, should, in the plan view onto the top or bottom surface, be bent at an angle of between 65° and 70°, in particular of 67.5°, relative to the main cutting edges. Therein, each of the main cutting edge sections should be delimited as symmetrically as possible on both sides of a corresponding secondary cutting edge. In this way, an axial smoothing movement in both directions is possible, which simplifies the corresponding machining methods.

Preferably, at least two projecting regions, and thus two main cutting edge sections, are provided 5 along the lateral surfaces concerned, these main cutting edge sections being interrupted by a recessed region, wherein secondary cutting edges extend from the ends of the main cutting edges into this recessed region. However, one embodiment of the invention is particularly preferred wherein a total of three projecting regions is provided, wherein one is provided centrally in the middle of the corresponding lateral surface and defines a centrally arranged main cutting edge, whilst the other two projecting regions are arranged in the vicinity of the oppositely disposed ends of that lateral surface, and form main cutting edge sections there which are delimited at the transition to the respective other lateral surfaces by relatively short secondary cutting edge sections, wherein the length of those secondary cutting edge sections is less than the depth of the recessed regions of the lateral surfaces.

One embodiment of the invention is particularly preferred wherein additional recesses in the machining surfaces are formed within the projecting regions, which recesses impart to the secondary cutting edges a positive cutting edge geometry during axial feed.

Furthermore, the angle formed between the secondary cutting edges and the main cutting edges, in conjunction with the free surfaces of the secondary cutting edges which are angled in the same way relative to the free surfaces of the main cutting edges, and in conjunction with the inclination of the cutting bit in the feed direction, during the axial feed causes the free surfaces of the secondary cutting edges to form a positive free angle with the work piece surfaces produced by the secondary cutting edges. This feature also reduces the axial cutting forces and feed forces which additionally helps towards smoother movement of the rotating work piece, or, in the case of a rotating tool, towards smoother movement of the tool, with the result that very high-quality surfaces can be produced by this kind of machining under conditions which are also very economical.

Expediently, a corresponding cutting bit has a central bore, the axis of which extends perpendicularly to the top and bottom surface. This bore can be tapered somewhat in the center of the cutting bit between the top and bottom surface, or, in the region of the top and bottom surface, it can define a seating of variable conicity for a tightening screw, so that the cutting bit can be fastened to an appropriate seating of an appropriate tool by the use of an appropriate tightening screw.

The geometry defined herein above of the cutting bit according to the invention also makes it possible advantageously and economically for the cutting bit to be able to be formed under compressive conditions which significantly reduces the production cost of such a cutting bit. At the same time, the cutting bit has a positive cutting geometry and a positive free angle, but nonetheless has cutting edges both at the top surface as well as at the bottom surface respectively, so that the cutting bit according to the invention combines excellent cutting properties with a very cost-effective method of manufacture, and, additionally, economical wear behavior.

The corresponding cutting tool is adapted to the cutting bit according to the invention, so that the seating for the cutting bit in that tool slopes relative to the feed direction of the tool at an angle of between 8 and 12°. In addition, the seating has a threaded bore for receiving a tensioning screw for fastening a corresponding cutting bit.

With the method according to the invention, preferred embodiments are characterized in that the angle of inclination of the top and bottom surfaces relative to the feed direction is within the range of 8 and 12°, wherein an angle of 10° has proven to be expedient in practice.

BRIEF DESCRIPTION OF THE DRAWINGS

Further advantages, features and possible applications of the present invention will emerge from the following description of a preferred embodiment and the accompanying drawings, wherein.

DESCRIPTION OF A PREFERRED EMBODIMENT OF THE INVENTION

Figure 1:
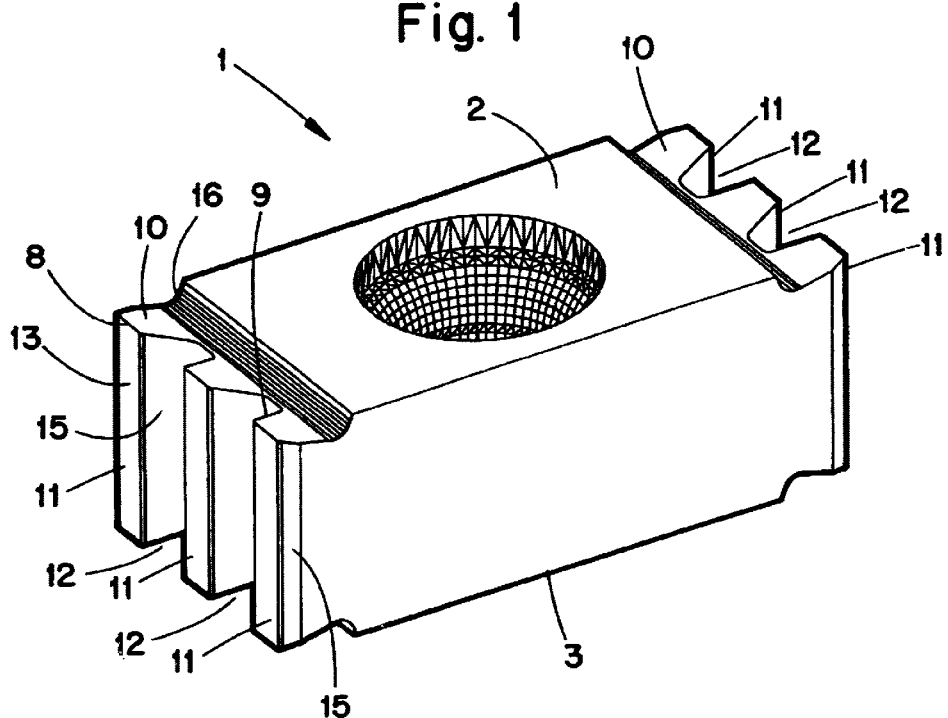
FIG. 1 shows a view in perspective of a cutting bit according to the invention.
Figure 2:
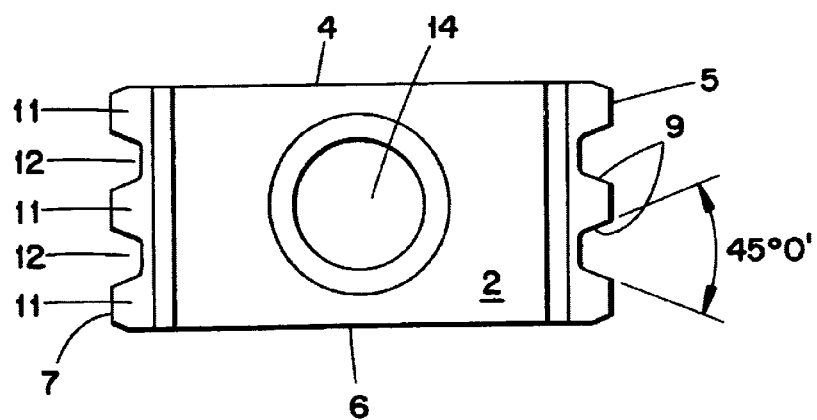
FIG. 2 shows a view in plan (on a smaller scale than FIG. 1) from above onto the top surface 2 of the cutting bit according to FIG. 1.

The view in perspective of FIG. 1 shows the cutting bit 1 which is essentially cuboid or prismatic in its basic shape and which has two substantially even and parallel top and bottom main surfaces 2 and 3 and lateral surfaces which extend perpendicularly thereto and which are denoted by the reference numerals 4, 5, 6 and 7 in FIG. 2. Therein, the oppositely disposed lateral surfaces 4 and 6 are also substantially even, whereas the remaining shorter oppositely disposed lateral surfaces 5 and 7 define alternate projecting regions 11 and recessed regions 12. Therein, however, the front surfaces 13 (see FIG. 1) of all projecting regions 11 are, in turn, disposed in a common plane, and the recessed regions 12 are of substantially the same depth and therefore, are offset to the same extent, back from the plane defined by the surfaces 13. The cutting line between the top and bottom surfaces 2 and 3 together with the oppositely disposed structured lateral surfaces 5 and 7 defines main cutting edges 8 which each extend accordingly along the farthest recessed regions of the top edge of the front surfaces 13, and secondary cutting edges 9 which extend along a section of the rearwardly extending sections of the surfaces 5 and 7. In the transitional region to the lateral surfaces 5 and 7, the top and bottom surfaces 2, 3 each have channels or recesses by which machining surfaces 10 are formed, on the one hand, which are adjacent to the cutting edges 8 and 9, wherein machine shaping surfaces 16 are disposed adjacently to the inside of the cutting bit and extend beyond the recessed regions 12 into the main part of the cutting bit 1, finally terminating at the plane of the top and bottom surfaces 2 and 3.

The cutting bit has the symmetry of a cuboid, i.e. it is laterally reversed with respect to three mutually perpendicular planes which extend parallel to the peripheries of the cuboid through the center of same, or, in other words, which extend rotationally symmetrically relative to rotations through 180° about three respective axes, perpendicular to each other, and passing through the center of the cuboid. In concrete terms, this means that each of the cutting bits 1 have four different cutting edge regions which can be used one after the other, and which, out of a group consisting of three main cutting edges 8, have secondary cutting edges 9 which are respectively adjacent to a main cutting edge 8.

Figure 3:
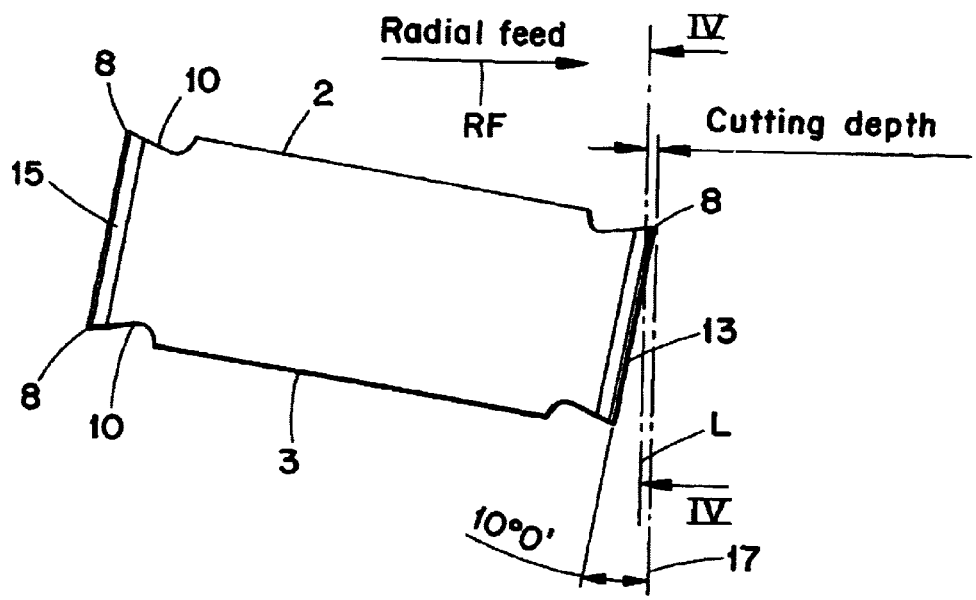
FIG. 3 shows, schematically, a side view of a cutting bit in the provided working position.

FIG. 3 is a schematic side view of the cutting bit 1 in an active cutting position during radial feed. The radial feed direction is indicated by an arrow RF, wherein the active cutting edge 8 is disposed exactly at the height of the axis of a rotating work piece, not shown here. On contact with the work piece, the vertical line 17 defines the position of a plane tangential to the machining surface of the rotating work piece.

As can be seen, the top and bottom surfaces 2 are inclined relative to the feed direction by an angle of about 10°, and therefore the surface 13 which defines a free surface relative to the cutting edge 9 is inclined by an angle of 10° to the tangential plane 17 on the surface of the work piece. However, at the same time, the machining surface 10 which is adjacent to the cutting edge 8 is inclined inwardly by at an angle α of about 16° relative to the top surface 2 of the cutting bit (and also relative to a plane P which is perpendicular to the plane of the front surfaces 13 of the projection regions 13), so that the cutting edge 8 still has a positive cutting geometry with a positive machining angle of about 6° relative to the surface of the work piece defined by the plane 17. A positive machining angle generally reduces the cutting forces occurring during machining. Another line which is parallel to the plane 17 indicates the maximum cutting depth provided for the cutting bit according to the invention. An end 16 of the machining surface 10 disposed remotely from the main cutting edge is recessed relative to a center portion 2a of the top surface 2 (see FIG. 6).

Figure 4:
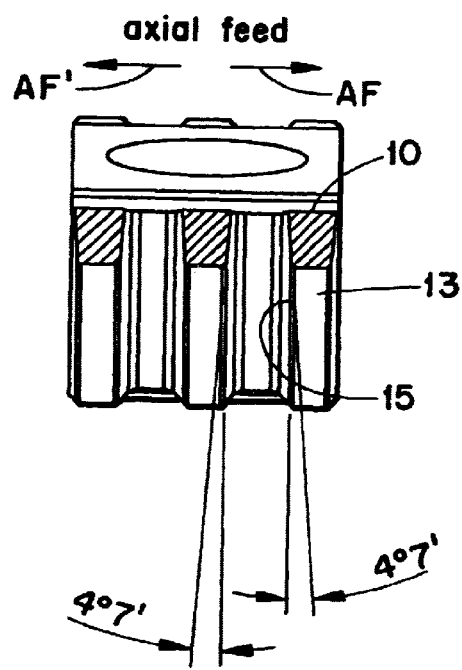
FIG. 4 is a view, partly in section, looking along the cutting plane IV—IV of FIG. 3.

If the cutting bit penetrates into the surface of the work piece to the provided cutting depth, grooves of trapezoidal cross-section are produced in the surface of the work piece by the three cutting edges 8 and the adjacent secondary cutting edges 9. The cutting bit 1 is then moved relative to the work piece axially, i.e. perpendicularly to the paper plane in FIG. 3, or, as shown in the frontal view of FIG. 4, in the paper plane, and, to be more exact, alternatively in both axial directions AF, AF'. As a result of this axial forward movement the secondary cutting edges 9 remove the material of the work piece which continues to exist in the grooves already produced. Due to the special shape and arrangement of the projections 11 and of the recessed regions 12 in conjunction with the inclination of the surfaces 2 and 3 relative to the horizontal, a positive free angle is also obtained for the secondary cutting edges 9 during axial feed. This is already indicated in FIG. 4 and is also illustrated more clearly in the larger scale drawings of FIGS. 5 to 7.

Figure 5:
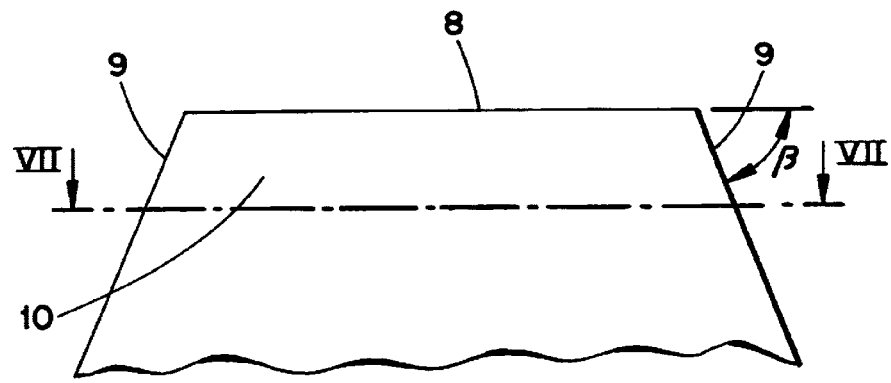
FIG. 5 shows, on a very large scale, and in a plan view from above, one of the projecting regions of a lateral surface.
Figure 6:
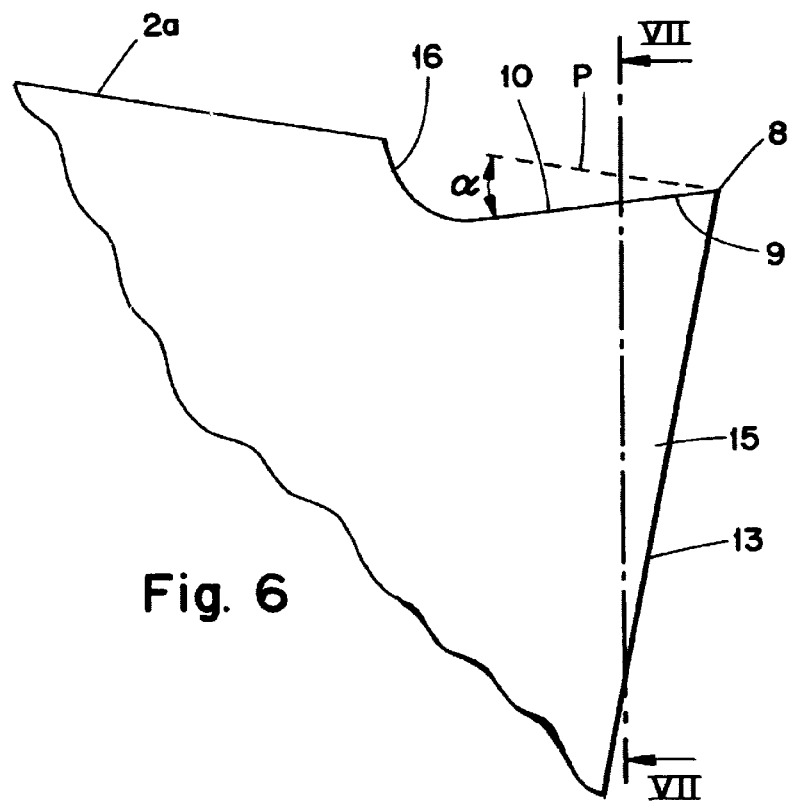
FIG. 6 is a side view, on a large scale, of the cutting edge region.
Figure 7:
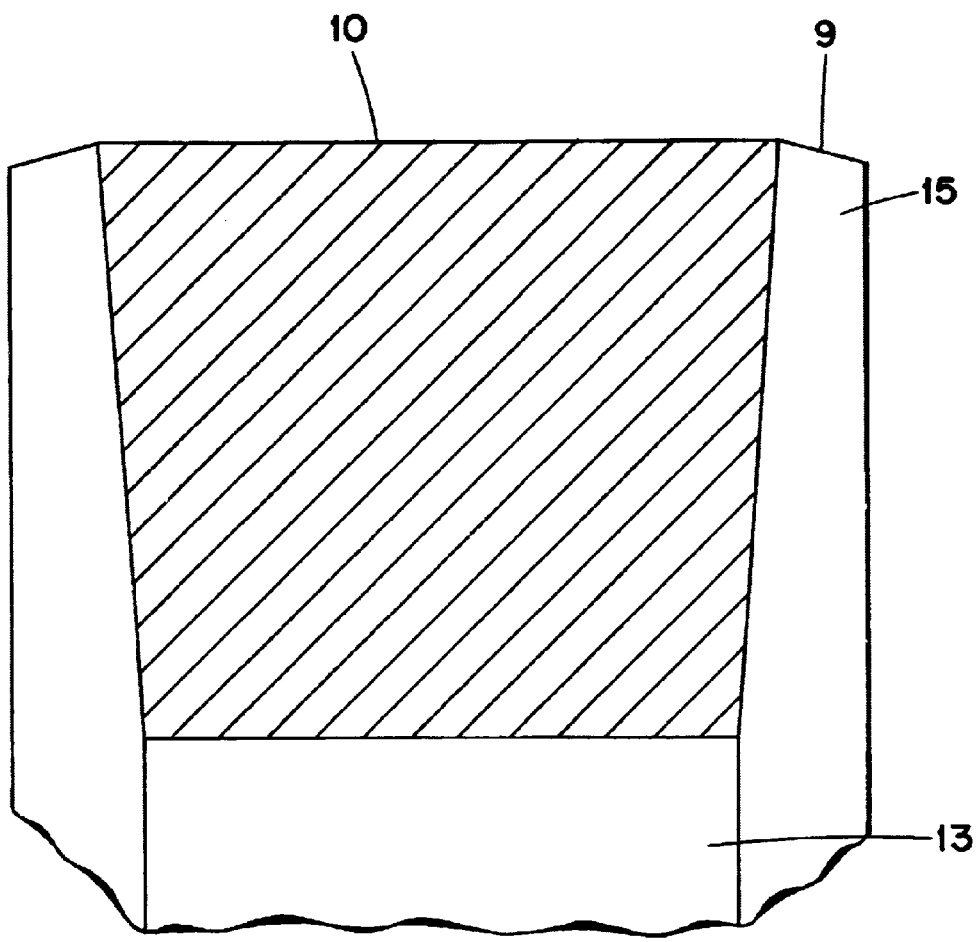
FIG. 7 is a view, partly in section, of a cutting plane along the line VII—VII of FIG. 6.

FIG. 5 is a view, from above, onto the machining surface 10 of one of the projecting regions 11 which is shown here merely in broken away manner. Therein, the main cutting edge 8 and the two adjacent secondary cutting edges 9 which define the machining surface 10 can be seen. A broken line is used to indicate a section plane VII—VII, wherein the corresponding sectional view is reproduced in FIG. 7. FIG. 6 is a side view of the cutting edge region of a corresponding cutting bit. Here too, the cutting bit is shown in its inclined working position, wherein the angle of inclination of the top surface 2 relative to the horizontal feed direction, or rather, the angle of inclination of the front free surface 13 relative to the surface of the work piece is less than the angle of inclination of the machining surface 10 relative to the surface 2, so that the cutting edge 8, as already mentioned, retains its positive cutting geometry. The surfaces 15 which likewise extend perpendicularly to the top surface 2 and which define secondary free surfaces relative to the secondary cutting edges 9 define the length of the secondary cutting edges 9. FIG. 6 also shows the cutting plane VII—VII, and the plan view of that cutting plane is shown in FIG. 7. The cutting plane VII—VII extends in the region of the secondary cutting edge 9, and by looking at FIGS. 5 and 6 in conjunction with each other it can be seen that from a region set further back at the top on the secondary cutting edge 9 the cutting plane VII—VII moves down towards the front free surface 13, and finally intersects it.

Since the secondary cutting edges 9 are angled somewhat relative to the main cutting edges 8 by an angle β of between 65 and 75°, preferably 67.5° and the secondary free surfaces 15 are angled accordingly by the same angle relative to the main free surfaces 13, a trapezoidal shape results in the plan view of the cutting plane, shown by shading in FIG, 7, so that in that cutting plane which is shown in FIG. 7 and which is also the plane of the axial feed direction of the cutting bits, the top machining surface 10 and the secondary free surface 15 form an angle of less than 90°. Therefore, for the secondary cutting edges too, a positive free angle results which is actually about 4° in the embodiment shown. Moreover, the machining surfaces 10 could also have recesses in the projecting regions 11, so that the secondary cutting edges 9 could furthermore also have a positive cutting geometry, but this does not exist in the embodiment shown in the drawings.

Due to the fact that all surfaces delimiting the projecting regions 11 and the recessed regions 12 extend exactly perpendicularly to the top and bottom surfaces 2 and 3, wherein the lateral surfaces 4 and 6 obviously also extend perpendicularly to those top and bottom lateral surfaces 2 and 3 (as also expressed by the term, "basic form of a prism"), the cutting bit according to the invention can be formed under compressive conditions, which makes production relatively cost-effective. Nonetheless, the cutting bit has a total of four cutting edge regions which can be changed over and used one after the other, and each of the cutting edge regions has a positive cutting geometry at least at the main cutting edges, and a positive free angle is formed both at the main free surfaces as well as at the secondary free surfaces. This special geometry assists in minimizing the cutting forces which occur, which results in the cutting bit being particularly suitable for fine machining and/or smoothing operations because the work piece is then also less easily inclined to shake or vibrate, thereby producing very smooth and neater surfaces. At the same time, due to the divided up cutting edges, the cutting insert is also suitable for rough machining, or roughing-down work, i.e. whilst the work pieces are rotating, the cutting bit can be used initially to form grooves radially, wherein the regions which have remained in the region of the insertion depth are then removed by axial forward and backward movements, whereupon the insertion operation can be repeated, and, finally, the last insertion operation, possibly employing a smaller insertion depth, is concluded by way of the final smoothing operation which takes place by axial forward and backward movements.

Therefore, the cutting bit according to the invention combines cost-effective manufacture with favorable wear behavior, greater versatility, greater economical efficiency due to the multiple, exchangeable cutting edges, and, finally, a very high machining quality. As already mentioned, the cutting bit could also be used to machine even surfaces, if it is secured to a rotating tool, for example, at the negative angle of attack relative to a surface 17 of the work piece, as defined in FIG. 3.

What is claimed is:

1. A cutting bit having the general form of a prism, comprising two substantially parallel top and bottom main surfaces and at least three lateral surfaces extending substantially perpendicularly to the main surfaces, wherein a cutting edge is formed at a transition between at least one of the lateral surfaces and at least one of the main surfaces; the at least one lateral surface including alternating projecting sections and recessed sections as the cutting bit is viewed in plan; each projecting section including a machining surface visible in plan view, and a front surface intersecting the machining surface to form a main cutting edge; each projecting section including at least one secondary edge joined to a respective main cutting edge and extending along one of the recessed sections; the machining surfaces being defined by the at least one main surface; the front surfaces being defined by the at least one lateral surface; each machining surface being inclined relative to its associated main cutting edge in a direction toward the opposite main surface to form a first angle in the range of 14° to 18° with an imaginary plane disposed perpendicular to the respective front surface; each secondary edge being inclined from its respective main cutting edge by a second angle in the range of 65° to 70° as viewed in plan.

2. The cutting bit according to claim 1 wherein the second angle is 67.5°.

3. The cutting bit according to claim 1 wherein the secondary edges are disposed symmetrically relative to the respective main cutting edges.

4. The cutting bit according to claim 1 wherein there are two pairs of lateral surfaces; one of the pairs being shorter than the other pair as the insert is viewed in plan; the shorter pair intersecting the at least one main surface to form the cutting edges.

5. The cutting bit according to claim 4 wherein the shorter pair intersect both of the main surfaces to form the cutting edges at both a top and bottom of the insert.

6. The cutting insert according to claim 1 wherein the secondary edges constitute cutting edges.

7. The cutting insert according to claim 1 further including a through-hole extending through both of the main surfaces.

8. The cutting insert according to claim 1 wherein additional recesses are formed in the machining surfaces which impart to the secondary cutting edges a positive cutting geometry during axial feed of the cutting bit.

9. The cutting bit according to claim 1 wherein the at least one main surface includes a center portion; the machining surfaces being inclined such that ends of the machining surfaces situated remotely of the main cutting edges are recessed with respect to the center portion.

10. A cutting tool including a cutting bit, the cutting bit having the general form of a prism, comprising two substantially parallel top and bottom main surfaces and at least three lateral surfaces extending substantially perpendicularly to the main surfaces, wherein a cutting edge is formed at a transition between at least one of the lateral surfaces and at least one of the main surfaces; the at least one lateral surface including alternating projecting sections and recessed sections as the cutting bit is viewed in plan; each projecting section including a machining surface visible in plan view, and a front surface intersecting the machining surface to form a main cutting edge; each projecting section including at least one secondary edge joined to a respective main cutting edge and extending along one of the recessed sections; the machining surfaces being defined by the at least one main surface; the front surfaces being defined by the at least one lateral surface; each machining surface being inclined relative to its associated main cutting edge in a direction toward the opposite main surface to from a first angle in the range of 14° to 18° with an imaginary plane disposed perpendicular to the respective front surface; each secondary edge being inclined form its respective main cutting edge by a second angle in the range of 65° to 70° as viewed in plan.

11. A method for machining work piece surfaces, comprising the steps of:
A) feeding radially toward the workpiece a cutting bit having the general form of a prism, comprising two substantially parallel top and bottom main surfaces and at least three lateral surfaces extending substantially perpendicularly to the main surfaces, wherein a cutting edge is formed at a transition between at least one of the lateral surfaces and at least one of the main surfaces; the at least one lateral surface including alternating projecting sections and recessed sections as the cutting bit is viewed in plan; each projecting section including a machining surface visible in plan view, and a front surface intersecting the machining surface to form a main cutting edge; each projecting section including at least one secondary edge joined to a respective main cutting edge and extending along one of the recessed sections; the machining surfaces being defined by the at least one main surface; the front surfaces being defined by the at least one lateral surface; each machining surface being inclined relative to its associated main cutting edge in a direction toward the opposite main surface to form a first angle in the range of 14° to 18° with an imaginary plane disposed perpendicular to the respective front surface; each secondary edge being inclined from its respective main cutting edge by a second angle in the range of 65° to 70° as viewed in plan; wherein the cutting bit being inclined relative to the direction of feed and forms a positive angle of more than 8° with a tangential plane lying on the respective main cutting edge, and B) moving the cutting bit axially relative to the workpiece for fine machining.

* * * * *